United States Patent [19]

Ichikawa et al.

[11] Patent Number: 5,486,942

[45] Date of Patent: Jan. 23, 1996

[54] METHOD OF MOUNTING A LIQUID CRYSTAL DISPLAY EMPLOYING SHOCK MOUNTS WITH RECEIVING SLOTS

[75] Inventors: Shinpei Ichikawa, Cupertino; Paul R. hamerton-Kelly, Palo Alto; Noah L. Anglin, San Jose, all of Calif.

[73] Assignee: Fujitsu Personal Systems, Inc., Santa Clara, Calif.

[21] Appl. No.: 283,112

[22] Filed: Jul. 28, 1994

Related U.S. Application Data

[60] Division of Ser. No. 809,536, Jan. 29, 1992, Pat. No. 5,363,227, which is a continuation of PCT/US90/03106, Jun. 27, 1990, which is a continuation-in-part of Ser. No. 359,191, May 31, 1989, Pat. No. 5,002,368.

[51] Int. Cl.⁶ .................... G02F 1/1335; G02F 1/1333
[52] U.S. Cl. .............................. 359/83; 359/62
[58] Field of Search ................. 359/83, 88, 62; 439/86; 248/917, 924, 603; 445/24

[56] References Cited

U.S. PATENT DOCUMENTS

| | | | |
|---|---|---|---|
| 4,515,440 | 5/1985 | Mosier | 359/83 |
| 4,545,647 | 10/1985 | Sasaki et al. | 359/83 |
| 4,639,062 | 1/1987 | Taniguchi et al. | 439/86 |
| 4,878,738 | 11/1989 | Hanami | 359/83 |
| 5,002,368 | 3/1991 | Anglin | 359/83 |
| 5,196,993 | 3/1993 | Herron et al. | 361/393 |
| 5,363,227 | 11/1994 | Ichikawa et al. | 359/83 |

FOREIGN PATENT DOCUMENTS

| | | | |
|---|---|---|---|
| 60-101521 | 6/1985 | Japan | 359/88 |
| 62-269930 | 11/1987 | Japan | 359/88 |

*Primary Examiner*—William L. Sikes
*Assistant Examiner*—Kenneth Parker
*Attorney, Agent, or Firm*—Skjerven, Morrill, MacPherson, Franklin & Friel; David W. Heid; E. Eric Hoffman

[57] ABSTRACT

A method for mounting a liquid crystal (LCD) display in a portable computer. In one embodiment, the method includes the steps of mounting resilient shock mounts on the edges of the LCD assembly, installing the LCD assembly and shock mounts into a housing, placing a horizontal plate into the housing over the LCD assembly and shock mounts (wherein the horizontal plate covers the shock mounts), and joining the horizontal plate to the housing to form the mounting structure. The shock mounts are compressed during the joining step. The LCD assembly is supported by the forces exerted by the housing and horizontal plate against the shock mounts, and is not directly connected to the housing or the horizontal plate.

8 Claims, 10 Drawing Sheets

CROSS SECTION OF UPPER HOUSING ASSEMBLY

SHOCK MOUNTS

METHOD OF MOUNTING A LIQUID CRYSTAL DISPLAY EMPLOYING SHOCK MOUNTS WITH RECEIVING SLOTS

CROSS REFERENCE

This application is a division of application Ser. No. 07/809,536, filed Jan. 29, 1992, now U.S. Pat. No. 5,363,227, which is a continuation of PCT/US90/03106 Jun. 27, 1990, which is a continuation-in-part of application Ser. No. 07/359,191, filed May 31, 1989, now U.S. Pat. No. 5,002,368, issued Mar. 26, 1991.

BACKGROUND OF THE INVENTION

This invention relates to a structure for mounting a liquid crystal display (LCD) in a portable computer housing and a method for making the mounting structure.

Conventionally, computers do not have impact absorption features to protect fragile components, such as LCDs, from damage due to dropping or other day-to-day handling of the computer. The conventional computer LCDs are mounted in a metal frame or hard plastic two-piece shell which structurally supports the LCD, but offers little protection against damage. Conventional lap-top computers are more prone to damage because they are transported more frequently. The conventional lap-top computer offers no more protection against damage to its fragile components, such as its LCD, than desk-top computers. Only the size of the computer and the location of the fragile structures within are factors which might reduce the potential for damage should the lap-top computer be dropped.

As portable computers become smaller, their associated compact structures have even less damage prevention capability. Furthermore, the more compact the portable computer is, the more frequently it will be transported. If the portable computer is transported more frequently during day-to-day use, the probability that it will be dropped, sat on, bent or otherwise mishandled increases. Therefore, the fragile LCD is more vulnerable to damage as the size of the computer decreases. Impact absorption features must be designed into the portable computer to minimize this vulnerability and make the portable computer durable over its lifetime.

SUMMARY OF THE INVENTION

Among the objectives of this invention are to provide a structure which can effectively absorb the impact of stress related to day-to-day handling of a portable computer, to minimize the number of parts and required assembly time, to reduce overall product cost, and to reduce the weight and size of the assembly in order to increase portability. According to this invention, a mounting structure for an LCD is provided which absorbs the shock from dropping and bending a portable computer, and thereby prevents damage to the LCD. The mounting structure and a method for making this mounting structure employ resilient shock absorbers, made from Sorbothane™ or low durometer silicone rubber for example, dimensionally sized and mounted along the edges of the LCD. The resilient material has elastic properties which give it compressibility as well as the ability to recover its original shape. The resilient shock absorbers are placed under a pre-load during assembly, wherein the pre-load is determined by factors such as the mass and the gravity-loading needed to support the LCD. The shock absorbers are typically compressed within a three-dimensional frame which provides a stiff structure so that the combined effect of the shock absorbers and the frame offer maximum protection to the LCD. During use, the resilient shock absorbers will absorb energy from deflecting, bending and dropping. The LCD and the shock absorbers are installed into a computer housing. After assembly into a computer housing, the mounting structure acts as a suspension system which supports the glass LCD and allows the glass to remain planar with bending of the housing. The housing is preferably made of plastic and is therefore more flexible than the glass LCD. Upon impact or other stress, bending of the housing is compensated by the resilient material, which is more flexible than the housing, so that most deformation of the housing is not transferred to the glass of the LCD. In one embodiment, the LCD assembly is hermetically sealed within the computer housing. Moreover, the LCD assembly can be evacuated before sealing the structure in order to protect the LCD from potentially trapped moisture, dust and other contaminants from the surrounding environment.

DETAILED DESCRIPTION OF THE INVENTION

Figure 1:
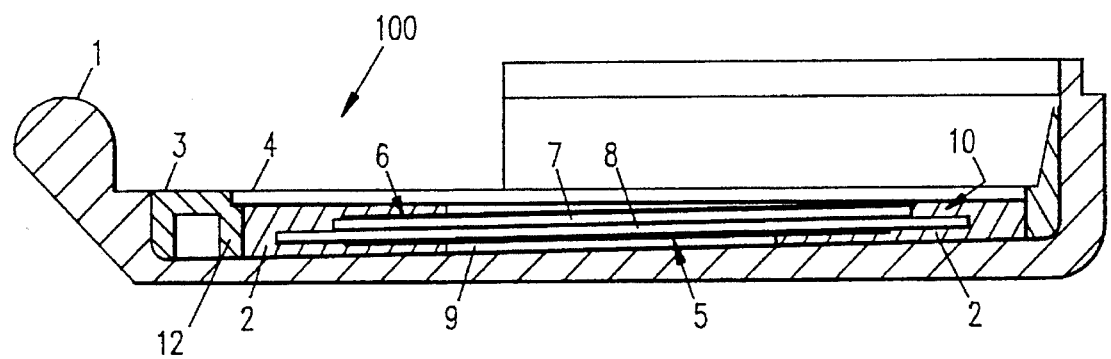
FIG. 1 is a cross-sectional view illustrating the housing assembly and the associated mounting structure of this invention according to a first embodiment.
Figure 3:
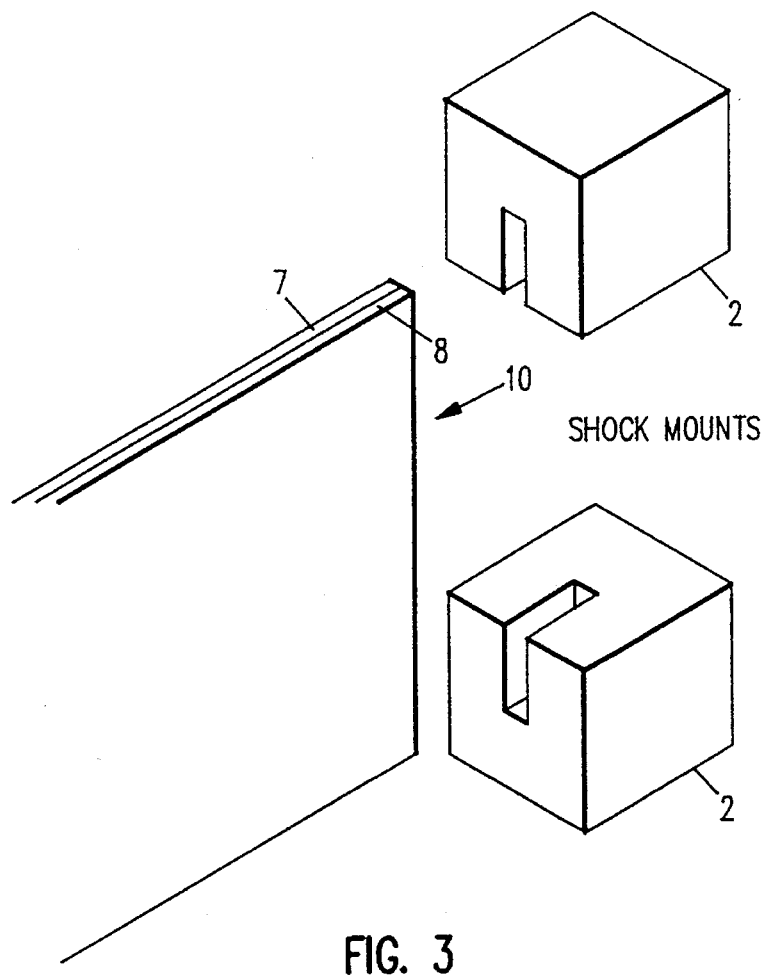
FIG. 3 is a perspective view of the shock mounts in the first embodiment.

FIG. 1 illustrates the first embodiment of LCD mounting structure 100. A housing 1 houses mounting structure 100. Mounting structure 100 holds an LCD assembly 10 and associated circuitry (not shown) within housing 1. LCD assembly 10 comprises a top glass 7 and a bottom glass 8, each glass preferably including a polarizer between which is located the liquid crystal material. Polarizer 6 is located on the LCD assembly top glass 7 and polarizer with reflector 5 is located on the LCD assembly bottom glass 8. The polarizers control the ambient light into and the reflected light out of the LCD, in particular controlling the polarization of light transmitted through LCD assembly 10. LCD assembly 10 has associated circuitry such as row driver circuitry and column driver circuitry on a printed circuit board, and flexible circuitry (all not shown) associated with LCD assembly 10. At each of the four corners of the LCD assembly 10, shock mounts 2 are mounted. The shock mounts 2 are made from a rubber material having resiliency, so that they are compressible but recover their original shape after the load is removed. The resilient material used for shock mounts 2 is preferably Sorbothane™ or a silicon rubber with a low durometer in the range of 15–20, for example. Shock mounts 2 are molded to conform to the corners of the joined pair of glasses 7 and 8. Shock mount 2 is preferably shaped, as shown in FIG. 3 for the first embodiment, to include a pocket having the dimensions of a corner portion of LCD assembly 10. Since one shock mount is required for each of the four corners of the LCD in this embodiment, the preferred design allows the same shock mount to be used at each corner, regardless of orientation. This greatly simplifies the assembly process and reduces part and tooling costs. Using small, separate shock mounts on the LCD reduces the amount of resilient material in the display assembly, reducing total cost and overall weight. The LCD assembly 10, the associated printed/flexible circuitry, and shock mounts 2 are placed into the housing 1. A three-dimensional frame 3 is placed over the LCD assembly 10 and shock mounts 2 to enclose the LCD and its circuitry. Three-dimensional frame 3 is constructed with sides 12 each attached along one edge thereof to a horizontal plate 4 having an opening for viewing the display. Horizontal plate 4 has an inside perimeter which defines an opening and an outside perimeter where sides 12 are attached. Sides 12 are securely attached or preferably integrally connected to horizontal plate 4 in the first embodiment. Sides 12 extend downward from horizontal plate 4. Adjacent sides 12 are securely joined together, or preferably integrally connected so that horizontal plate 4 and sides 12 form a rigid 3-dimensional frame 3. Sides 12 are preferably perpendicular to horizontal plate 4 and adjacent ones of sides 12 are preferably perpendicular to each other in the first embodiment. The horizontal plate 4 is preferably of a single-piece construction, but can be formed in parts which are securely joined together. The first embodiment further comprises a transparent sheet 15 which is securely attached along the inside perimeter of horizontal plate 4 to fit within the opening. Transparent sheet 15 can be ultrasonically welded to horizontal plate 4, or preferably is integrally connected. Transparent sheet 15 is attached to horizontal plate 4 prior to installation of the three-dimensional frame 3 into housing 1. When molded as one part, this attachment step is not necessary before installation. The three-dimensional frame 3 can be made from polycarbonate plastic, such as Lexan or the like. Transparent sheet 15 can be made from transparent Lexan. Sides 12 of the three-dimensional frame 3 slide into housing 1 around the outer periphery of the LCD assembly 10, associated circuitry, and shock mounts 2. Horizontal plate 3 rests on shock mounts 2 and transparent sheet 4 covers top glass plate 7 of LCD assembly 10 when installed into housing 1. Before three-dimensional frame 3 is joined with housing 1, pressure is applied to the horizontal plate 4 to compress shock mounts 2 preferably to 75 percent of their original volume. While shock mounts 2 are under compression, three-dimensional frame 3 is ultrasonically welded or chemically bonded to housing 1 to seal the structure. This bonding step allows horizontal plate 4, transparent sheet 15 and sides 12 to form a 3-dimensional mounting structure 100 with housing 1, thereby producing a structure 100 according to the first embodiment with much greater stiffness than the individual components 1, 3, 4, 12 and 15.

Figure 2:
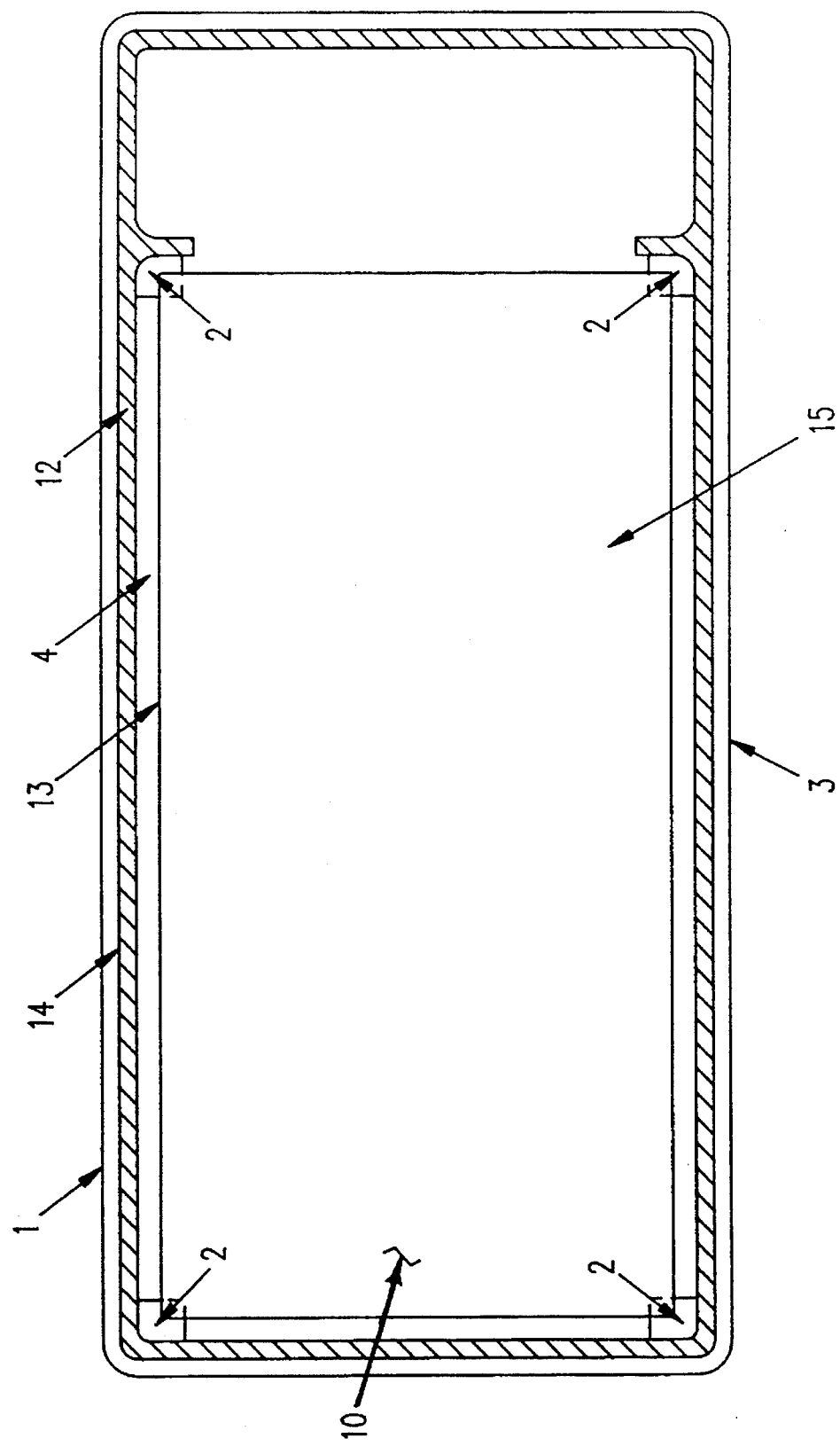
FIG. 2 is a front view illustrating the resilient shock mounts at the corners of the LCD assembly according to the first embodiment.

In a further embodiment, the assembly is evacuated by pulling a vacuum during the assembly process just prior to hermetic sealing. Referring to FIG. 2, three-dimensional frame 3 is hermetically sealed along line 14 of the outer perimeter of horizontal plate 4. Once hermetically sealed, the LCD assembly 10 is protected from the atmosphere and contamination, namely from humidity, dust, and dirt.

FIG. 2 illustrates a front view of the LCD mounting structure of the first embodiment. Four shock mounts 2 are shown in the four corners of LCD assembly 10. The transparent overlay 15 is placed directly over LCD assembly 10. The horizontal plate 4 can be a bezel which outlines and frames LCD assembly 10. The transparent overlay 15 is joined with horizontal plate 4 at line 13 and horizontal plate 4 is joined to the housing 1 at line 14. Horizontal plate 4 and transparent overlay 15 of the first embodiment form a stiff and rigid three-dimensional structure with housing 1 when horizontal plate 4 is formed of polycarbonate, and housing 1 is formed of ABS/polycarbonate alloy. Moreover, a rigid three-dimensional structure is created when horizontal plate 3 and transparent overlay 4 are 0.04" thick, housing 1 is 0.100" thick, and horizontal plate 4 is securely joined to housing 1. Other thicknesses may provide sufficient rigidity for most day-to-day handling, but the above thicknesses are optimum and preferable.

A second embodiment of the present invention is illustrated in FIGS. 4 and 5A–5D. Mounting structure 400 of the second embodiment comprises horizontal plate 46. Horizontal plate 46 includes frame 43 surrounding a transparent sheet 44. Transparent sheet 44 may be a separate piece securely joined at its outside perimeter to the inside perimeter of frame 43. Alternatively, frame 43 and transparent sheet 44 may be simply parts of a single horizontal plate 46. Frame 43 is preferably opaque to hide electronic components below and preferably includes markings related to information to be displayed by an LCD 40. Mounting structure 400 further comprises resilient shock mounts 42a, 42b which are preferably placed along the two shorter edges of LCD 40 according to the second embodiment. Resilient shock mounts 42a, 42b are made from a low durometer material, preferably silicone rubber having from 15 to 50 durometers, and preferably in the range from 30 to 40 durometer, and are illustrated in FIGS. 5A–5D.

Figure 5A:
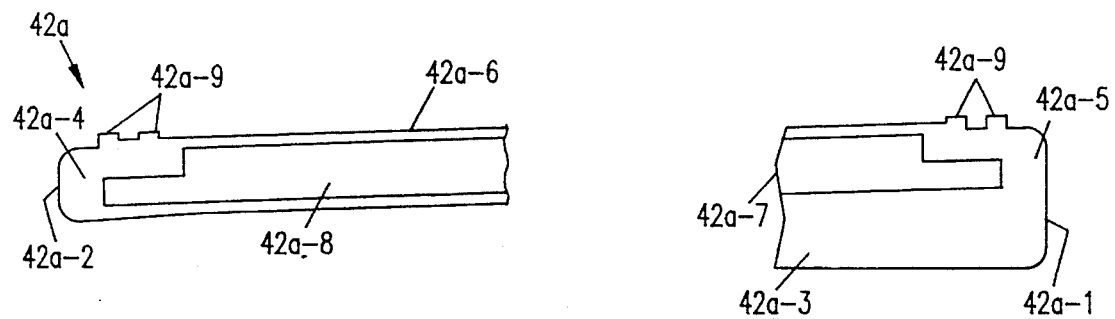
FIGS. 5A and 5B are cross-sectional views of the shock mounts according to second and third embodiments.
Figure 5B:
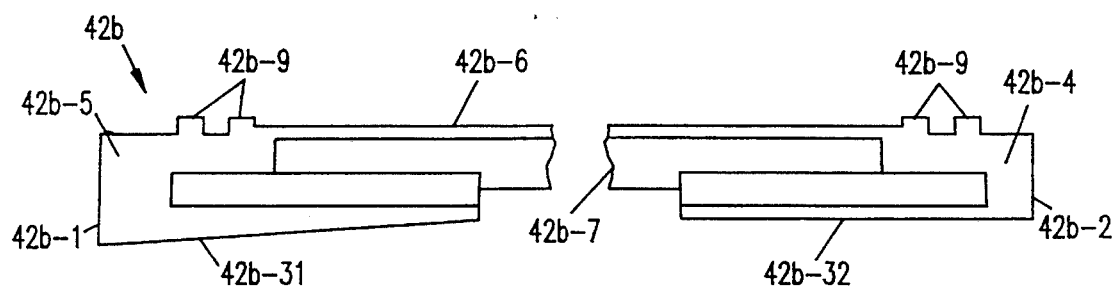
Figure 5C:
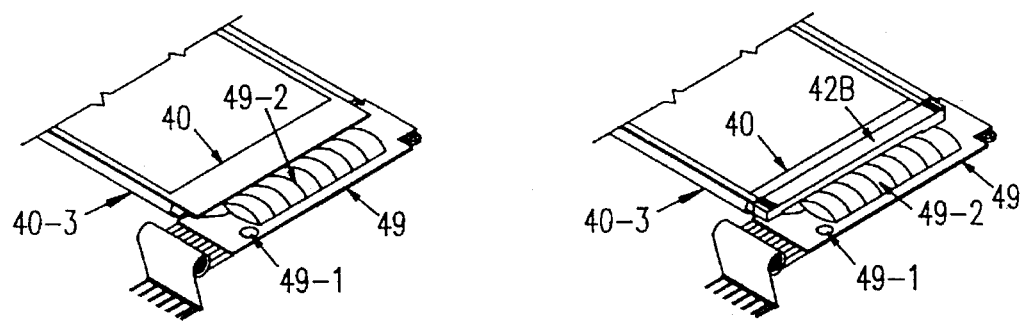
FIG. 5C is a perspective view of the LCD in combination with a printed circuit board, both with and without shock absorbing resilient material.
Figure 5D:
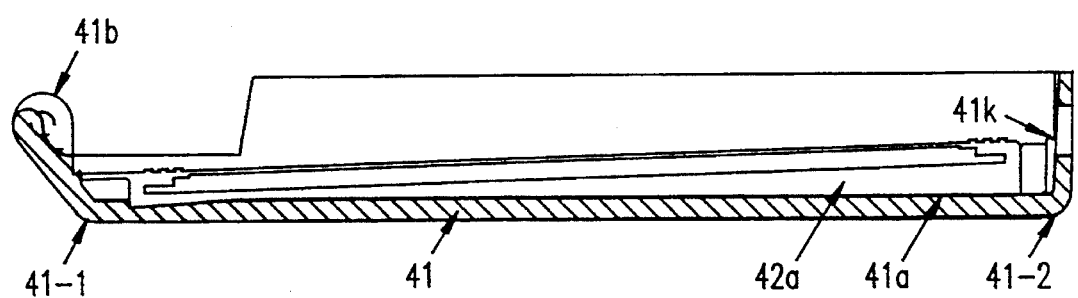
FIG. 5D is a cross-sectional view illustrating the housing assembly and associated mounting structure according to a second embodiment.

Referring to FIGS. 5A–5D, resilient shock mounts have first shock mount shape 42a and second shock mount shape 42b. The shape of shock mounts 42a and 42b differ because shock mount 42b must accommodate printed and flexible circuitry 49 which is attached to edge 40-3 of LCD 40, as illustrated in FIG. 5C. Moreover, shock mounts 42a and 42b must conform to the shape of housing 41, as illustrated in FIG. 5D.

Figure 7:
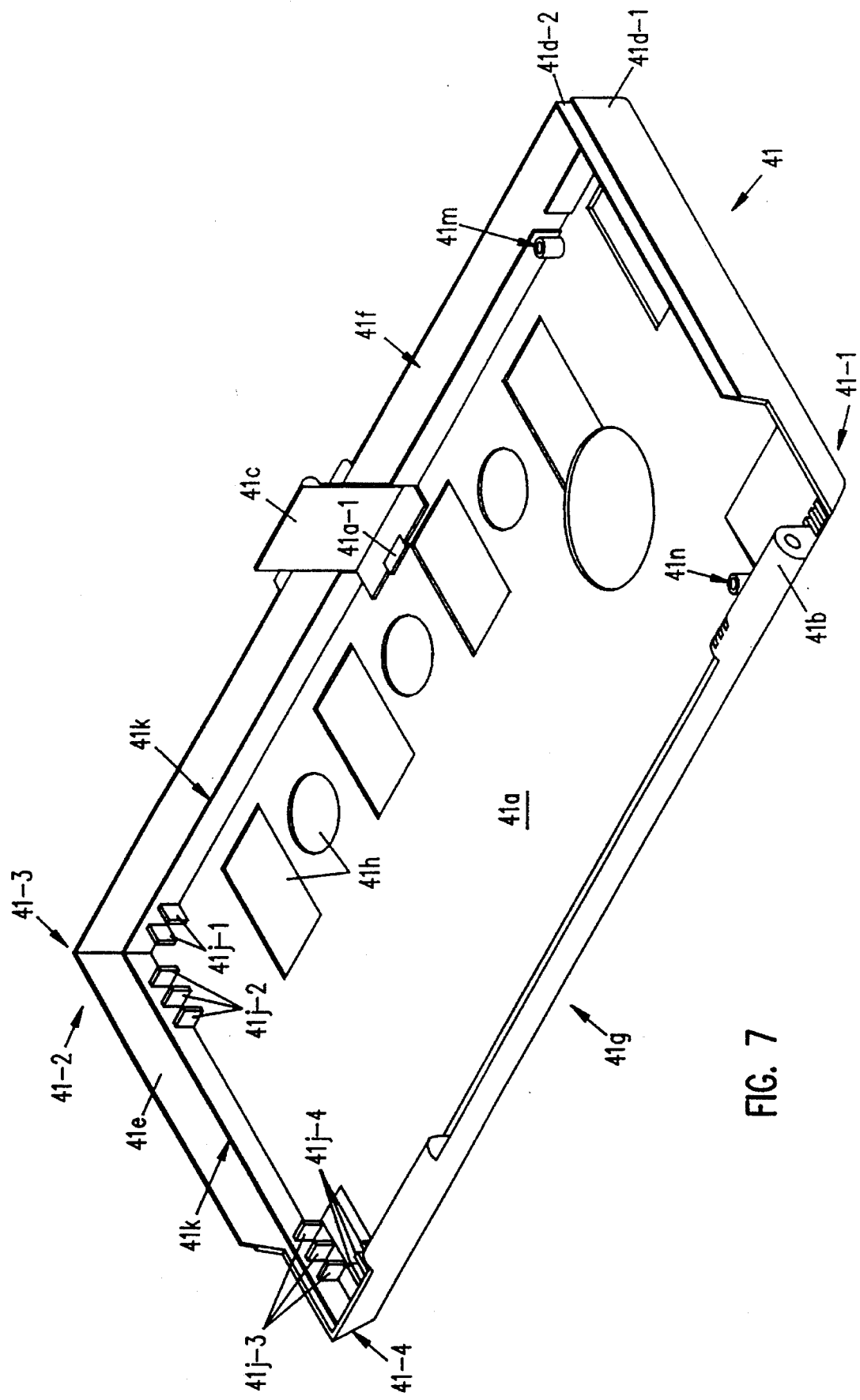
FIG. 7 is a perspective view illustrating in more detail the upper housing of the second embodiment.

As illustrated in FIG. 7, housing 41 comprises sides 41d–g, wherein side 41d is opposite to 41e and side 41f is opposite to 41g. Sides 41d–f have two thicknesses, wherein a thicker tier 41d–f(-1) is adjacent to back wall 41a, while a thinner tier 41d–f(-2) extends from and is adjacent to only thicker tier 41d–f(-1).

Housing 41 further comprises recesses 41h in back wall 41a. Recesses 41h have various shapes or configurations and are located in back wall 41a to accommodate protruding electronic circuitry (not shown) on LCD 40. Recesses 41h may be machined in back wall 41a after housing 41 is molded. Recesses 41h can be incorporated into the molding process to eliminate this machining step.

Housing 41 still further comprises protrusions 41j located at the corners of housing 41. In the second embodiment, two protrusions 41j-1 protrude internally from side 41f adjacent to corner 41-3 and three protrusions 41j-2 protrude internally from side 41e adjacent to corner 41-3 also. Adjacent to corner 41-4, three protrusions 41j-3 extend from side 41e internally and two protrusions 41j-4 extend from side 41g internally. All protrusions are integrally connected to back wall 41a and the thicker tier 41e-1, 41f-1 of sides 41e and f, respectively. The protrusions serve as pressure points which deform the shock mount locally under load. They also serve to locate the shock mount without adding undesirable thickness to the housing walls. The height of each group of protrusions is dictated by a sealing ledge 41k. Sealing ledge 41k extends along the inner perimeter of housing 41 on all four sides 41d–g. Sealing ledge 41k receives horizontal plate 46. Sealing ledge 41k is further away from back wall 41a on side 41f than on side 41g which is opposite to side 41f. Therefore, sealing ledge 41k is slanted at an angle on opposite sides 41e and 41d defined by the height of sealing ledge 41k on sides 41f and 41g.

Figure 4:
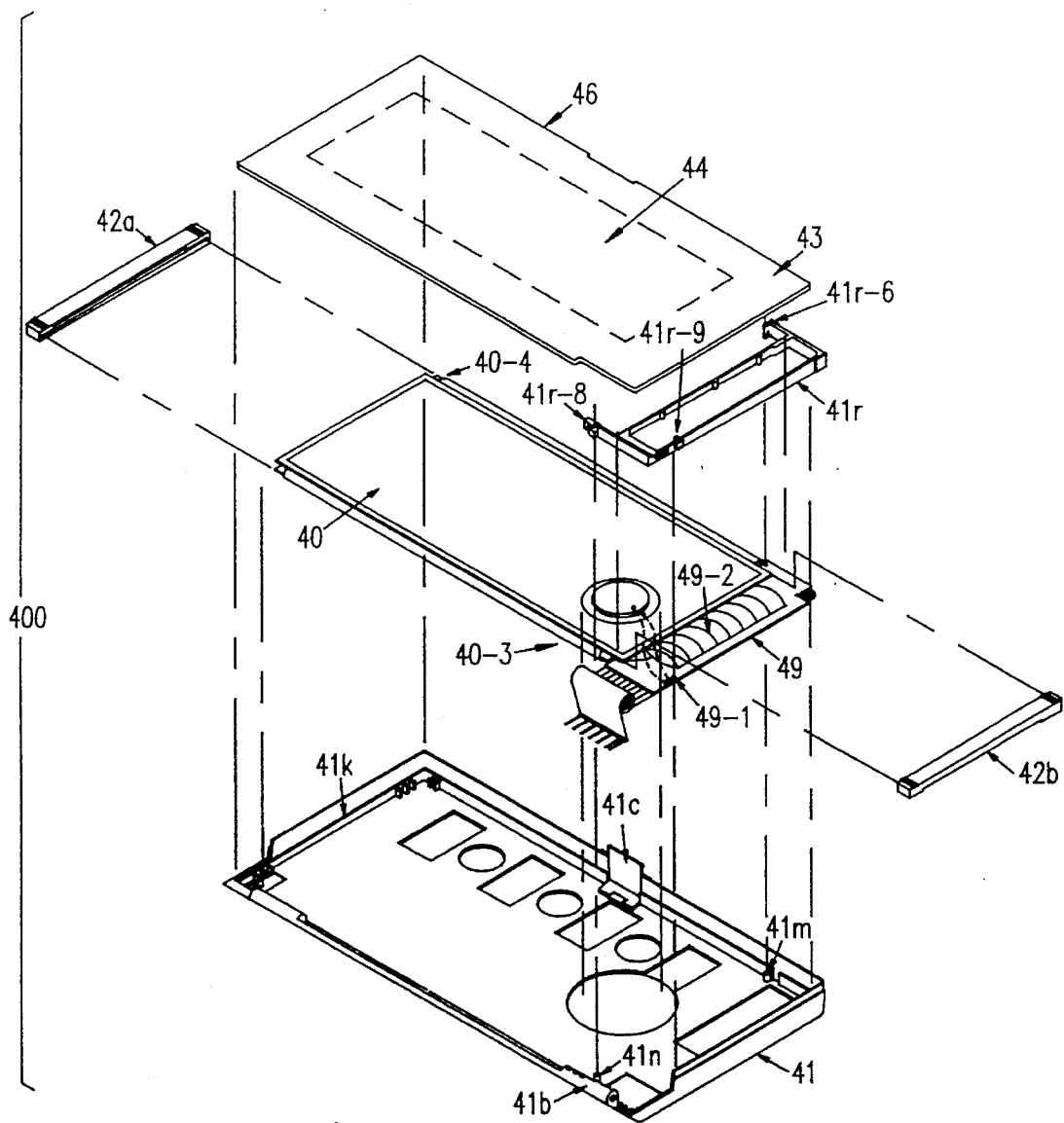
FIG. 4 is a perspective exploded view illustrating the LCD mounting structure of a second embodiment.

Referring to FIG. 5A, shock mount 42a is applied to edge 40-4 (see FIG. 4) of LCD 40. A bottom membrane 42a-3 made of the same resilient material extends from end 42a-1 to end 42a-2 of shock mount 42a. Bottom membrane 42a-3 is thicker at end 42a-1 than at end 42a-2, thereby leaving clearance for electronic components under LCD 40 and allowing the front surface of LCD 40 to be at an angle with respect to housing 41. Both ends 42a-1 and 42a-2 have a wrap around configuration 42a-4 and 42a-5 and a thin sheet of resilient material forming top membrane 42a-6 which extends from oppositely extending wrap arounds 42a-4 and 42a-5. Shock mount 42a has a rear wall 42a-7 extending from end-to-end (42a-1 and 42a-2) adjacent to top membrane 42a-6 and bottom membrane 42a-3. Opposite to rear wall 42a-7 is an opening 42a-8 which exposes the cavity or receptacle for edge 40-4 of LCD 40. Wrap around configurations 42a-4 and 42a-5 are sized to receive corner portions of edge 42a-4 of LCD 40. Located on the top of wrap arounds 42a-4 and 42a-5 are ribs 42a-9. Ribs 42a-9 protrude out from shock mount 42a. Ribs 42a-9 function as pressure points when shock mounts 42a are compressed during assembly.

Referring to FIG. 5B, shock mount 42b is similar to shock mount 42a except that bottom membrane 42b-3 has been cut away so that it no longer extends from end-to-end (42b-1, 2). Bottom portions 42b-31 and 42b-32 are located only at ends 42b-1, 2 and form part of wrap around configurations 42b-4 and 42b-5. Moreover, rear wall 42b-7 is adjacent to top membrane 42b-6 and extends from end-to-end, but is adjacent to respective bottom portions 42b-31, 32 only at ends 42b-1, 2. Shock mount 42b is shaped as described above to accommodate the associated circuitry 49 at edge 40-3 of LCD 40, as illustrated in FIG. 5C. As shown in FIG. 5D, shock mount 42a is installed on LCD 40 so that bottom membrane 42a-3 contacts the back wall 41a of housing 41. The thicker end of shock mount 42a (end 42a-1, see FIG. 5A) is placed against a thicker edge 41-2 of housing 41 so that LCD 40 is raised up from back wall 41a and is essentially at an angle to the back wall 41a of housing 41, as illustrated in FIG. 5D.

Membranes 42a-6 and 42b-6 serve to maintain an air gap between the LCD and transparent sheet 44, to avoid optical interference in the LCD viewing area.

When mounting structure 400 of the second embodiment is assembled, shock mounts 42a and 42b are mounted onto edges 40-4 and 40-3 of LCD 40, respectively. The associated electronics are already assembled to LCD 40, as illustrated in FIG. 4. Edge 40-4, having shock mount 42a attached thereto, is placed within housing 41 so that rear wall 42a-7 and ends 42a-1,2 of shock mount 42a are received by protrusions 41j located at the corners of housing 41. Edge 40-3 and the associated electronics 49 are placed into housing 41, and a bracket 41r (see FIG. 8) is placed over the associated electronics to hold the electronics and edge 40-3 in place.

Figure 8:
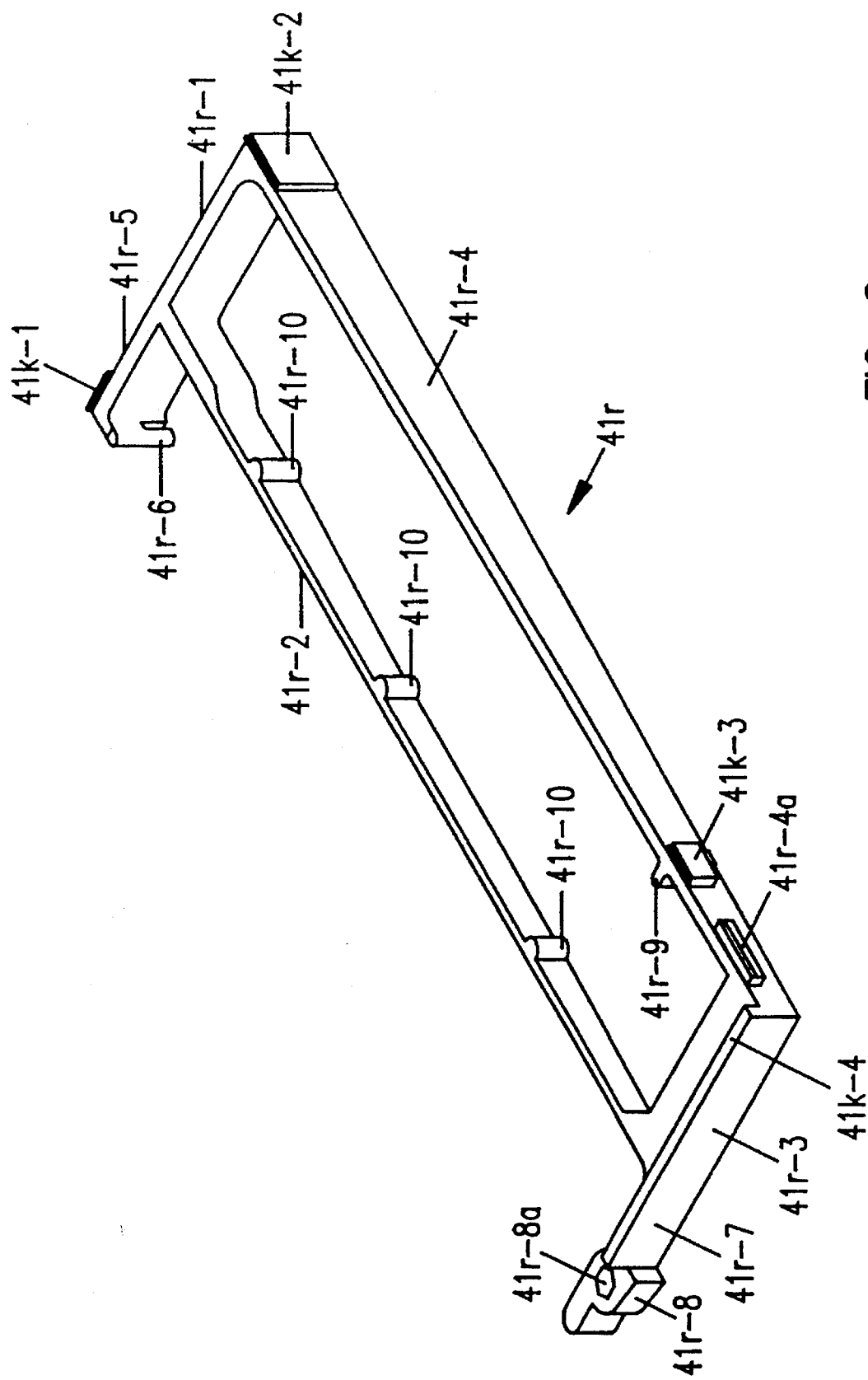
FIG. 8 is a perspective view of an LCD electronics support bracket, as used in the second and third embodiments.

Bracket 41r has four sides preferably designed to outline the edges of the associated electronics 49 on edge 40-3 of LCD 40. Referring to FIG. 8, one side 41r-1 of bracket 41r has extension 41r-5 comprising end piece 41r-6 for cooperating with receptacle 41m in back wall 41a of housing 41. Extension 41r-5 also comprises a portion of sealing edge 41k from side 41f of housing 41. Another side 41r-3, opposite to side 41r-1, has an extension 41r-7 comprising end piece 41r-8. Hexagonal hole 41r-8a in end piece 41r-8 provides a locking interference fit when pressed onto cylindrical post 41n in back wall 41a. Tab 41r-4-a fits into an undercut (not shown) in housing side wall 41-d, which combines with post 41n to positively lock bracket 41r over LCD electronics 49 and into housing 41. Side 41r-4 has hook 41r-9 extending internally away from side 41r-4 and downward. Hook 41r-9 is received by printed circuitry 49 in hole 49-1. Moreover, side 41r-4 comprises additional portions of sealing edge 41k from side 41d of housing 41. Side 41r-2, which is opposite to side 41r-4, has semi-circle-shaped cylindrical bosses 41r-10 which protrude internally from side 41r-2. Bosses 41r-10 function to allow easier removal of part 41r from the mold used during injection molding of part 41r. Side 41r-2 bridges over flexible circuitry 49-2 to hold shock mount 42b and LCD edge 40-3 in place.

Bracket 41r locks with housing 41 at at least points 41r-6, 41m and 41r-8a, 41n to hold edge 40-3 of LCD 40 within housing 41.

Horizontal plate 46 (FIG. 4) is placed over LCD 40 in housing 41. The outer perimeter of horizontal plate 46 rests on sealing edge 41k of housing 41 and bracket 41r. Horizontal plate 46 is attached, preferably ultrasonically welded to housing 41 at sealing edge 41k and to bracket 41r at four sealing edges 41k-1, 41k-2, 41k-3, 41k-4. The second embodiment can be hermetically sealed and evacuated prior to hermetic sealing as described above for the first embodiment also. A three-dimensional rigid box is created by the combination of horizontal plate 46, housing 41 and sides 41d–g of housing 41 after plate 46 is welded onto housing 41.

Figure 6A:
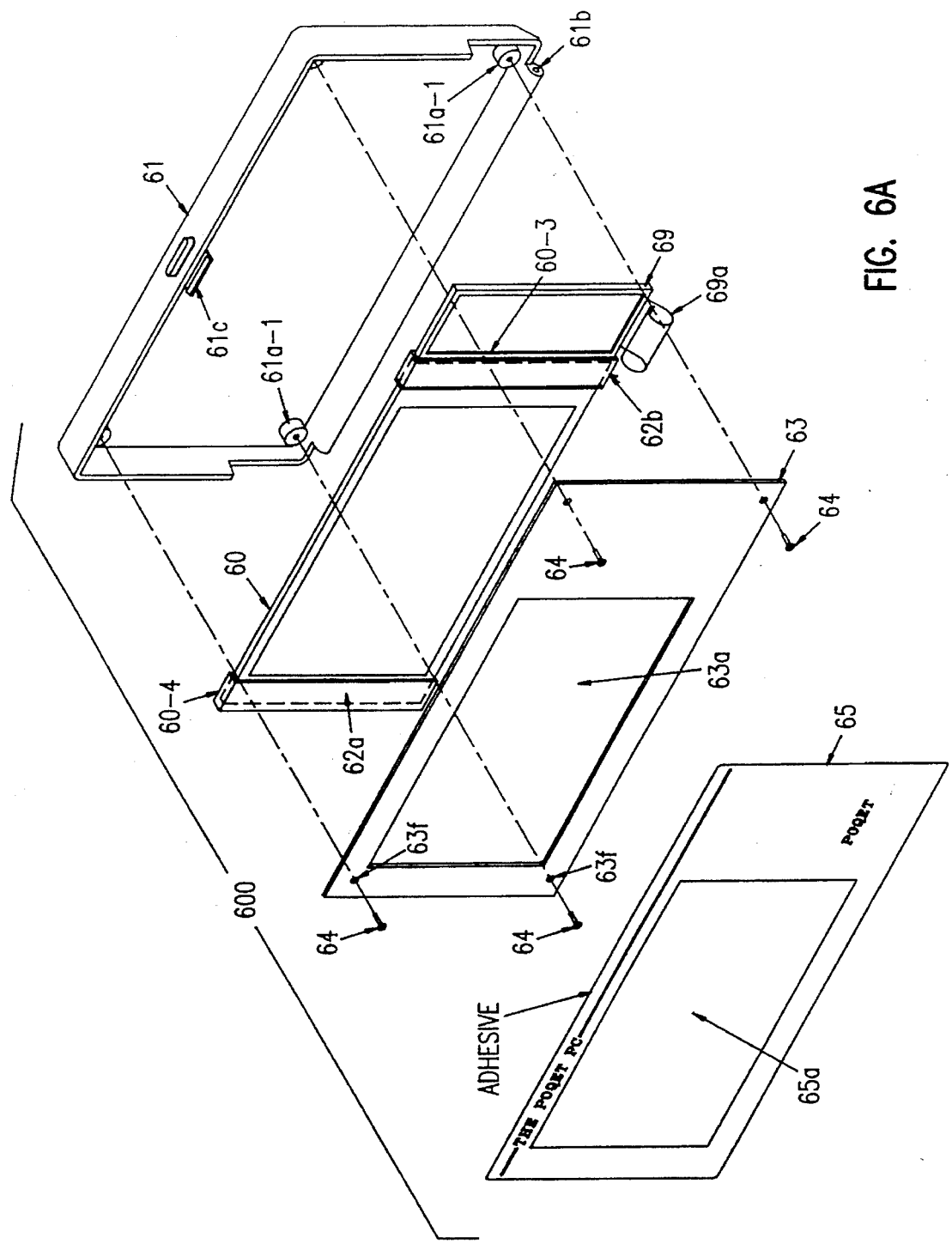
FIG. 6A is a perspective exploded view illustrating the LCD mounting structure of a third embodiment.
Figure 6B:
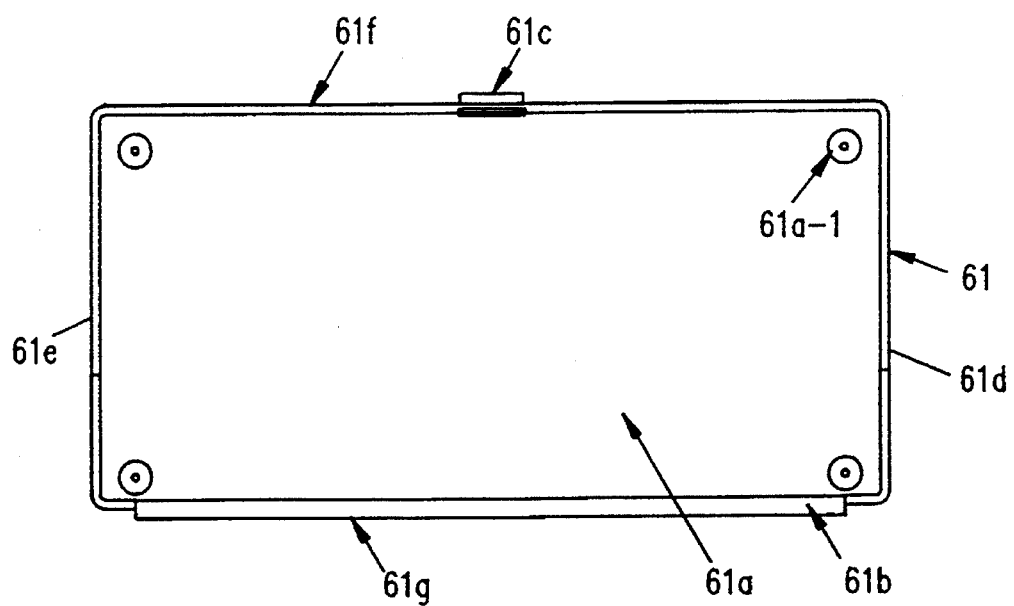
FIGS. 6B–6E are front views of the layers shown in FIG. 6A.

The third embodiment of the LCD mounting structure is illustrated in FIGS. 6A–6E. LCD mounting structure 600 comprises housing 61 which has upwardly extending sides 61d–g and screw receiving holes 61a-1 integrally associated with back wall 61a of housing 61. FIG. 6B illustrates the inside of housing 61. Sides 61f and 61g are opposite to each other and side 61f is adapted to receive latch 61c while side 61g is adapted to form hinge 61b which will receive a hinge pin.

Figure 6D:
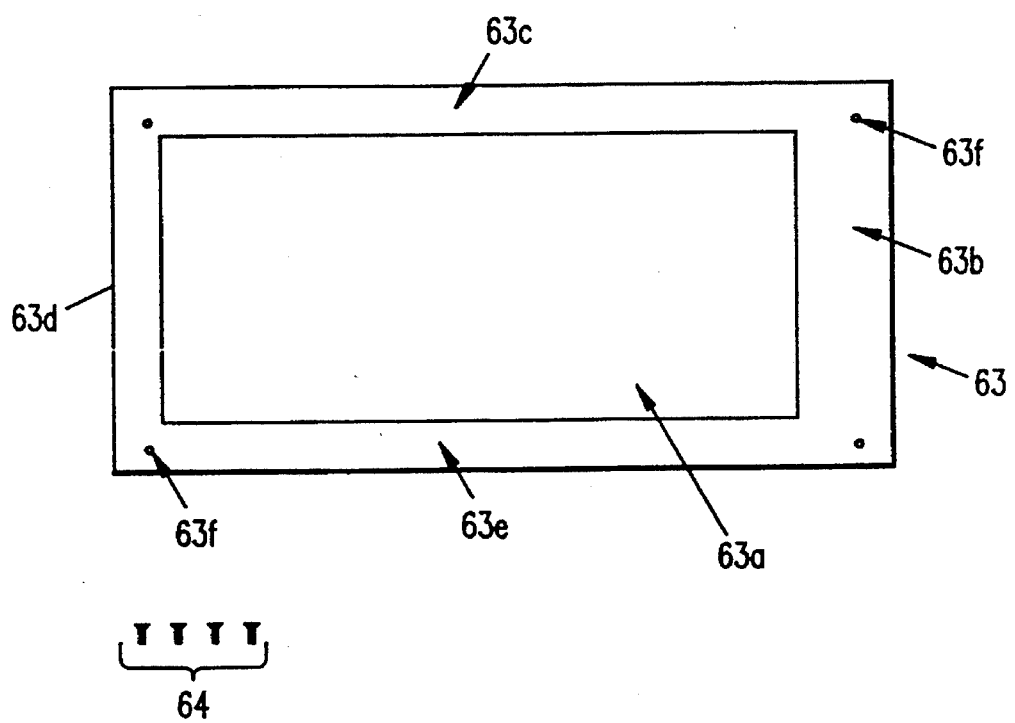
Figure 6C:
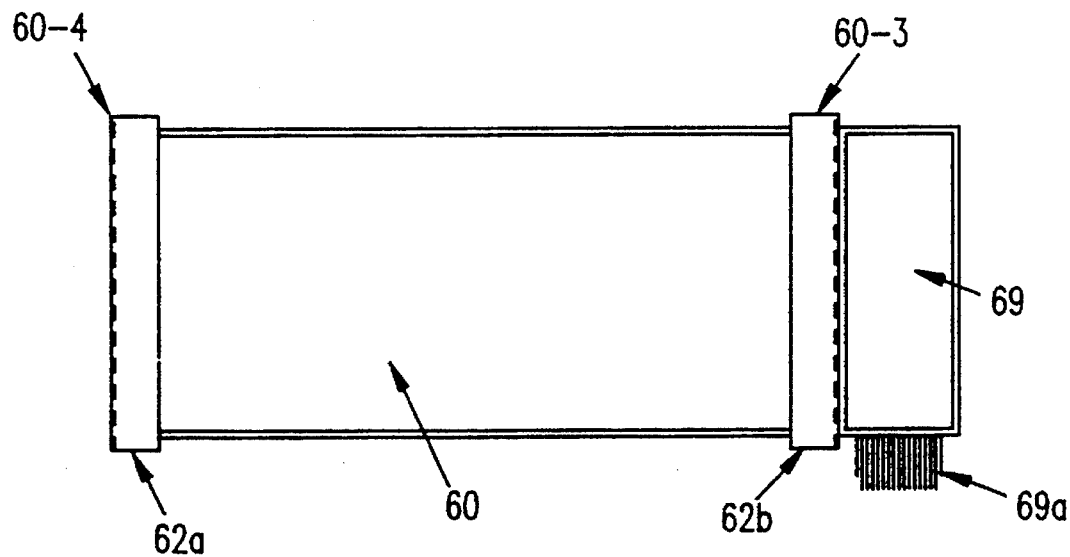

Resilient shock mounts 62a,b are mounted on the edges 60-4,3 of an LCD 60, respectively, as illustrated in FIG. 6C. Shock mounts 62a,b are similar to the shock mounts 42a,b of the second embodiment. Also shown in FIG. 6C is row driver printed circuitry 69 and flexible cable 69a associated with edge 60-3 of LCD 60.

Figure 6E:
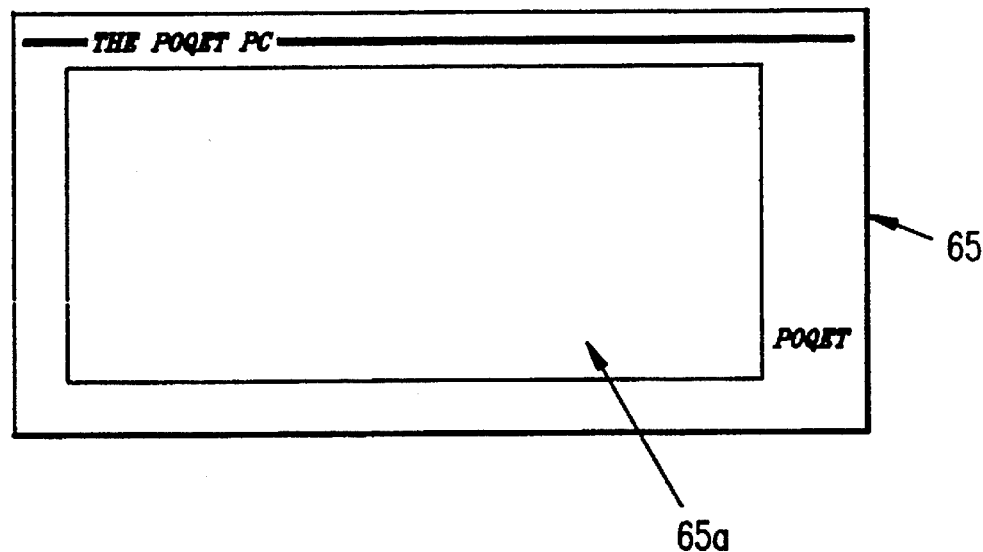

LCD 60, associated circuitry, and shock mounts 62a,b are held within housing 61 by LCD frame 63. Referring to FIG. 6D, LCD frame 63 is a horizontal plate having an inside perimeter and an outside perimeter. The inside perimeter defines a display window 63a and is shaped with a flange. Frame portion 63b is wider than portions 63c–e so that row driver printed circuitry 69 is hidden from view when LCD frame 63 is mounted over LCD 60 in housing 61. LCD frame 63 also comprises through-holes 63f near the four corners of LCD frame 63. Through-holes 63f receive screws 64. Screws 64 connect LCD frame 63 to housing 61 after LCD 60 is placed in housing 61. FIG. 6E illustrates overlay 65 which preferably provides the logo information and display symbols for LCD 60. Overlay 65 can be made of plastic, preferably polycarbonate, and has an inner perimeter defining a window 65a. One side of overlay 65 has an adhesive applied. The adhesive side of overlay 65 adheres to LCD frame 63 after assembly. After assembly, overlay 65 covers screws 64. Mounting structure 600 is assembled by aligning LCD 60, having resilient shock mounts 62a,b mounted on the edges thereof, inside housing 61 as illustrated in FIG. 6A. LCD 60, associated circuitry, and shock mounts 62a,b fit within an area defined by screw receiving holes 61a-1. A bracket similar to bracket 41r may be placed over circuitry 69 and its associated flexible circuitry (not shown) to hold circuitry 69 in place in housing 61. Alternatively the retaining features of bracket 41r may be incorporated in the rear surface shape of LCD frame 63. LCD frame 63 is placed over LCD 60 and the associated parts and screws 64 are inserted to attach LCD frame 63 to housing 61, thereby enclosing LCD 60 and the associated parts within. After screws 64 are inserted, overlay 65 is adhered to LCD frame 63. A rigid three-dimensional box is created according to the third embodiment by the cooperative effects of housing 61, LCD frame 63 and screws 64. The third embodiment has the advantages of allowing disassembly and repair of the LCD and associated electronics, or replacement of plastic parts. This will improve production yield and reduce unit cost. A non-glare film 60c applied to LCD 60 functions as the transparent sheet 44 of FIG. 4 so that the display can be viewed and the LCD simultaneously protected. Installing the LCD with no cover sheet increases display contrast and readability, eliminates optical interference problems, and prevents accidental trapping of moisture or foreign material in the viewing area. LCD frame 63 having window 63a frames LCD assembly 60 to create a display window.

Mounting structures 100 (first embodiment), 400 (second embodiment), and 600 (third embodiment) allow the LCD glass plates to float with respect to the housing. The housing may be deformed or otherwise stressed by dropping or compressing its associated portable computer, but the LCD glasses remain relatively flat and cushioned from the shock and load. Effectively, the mounting structures suspend the LCD glasses, and leave the glass more nearly planar when the housing is deformed. The effectiveness of mounting structure 400 was tested by dropping two prototype portable computers having the second embodiment of the present invention incorporated therein from a height of ten feet onto concrete several times. The LCD assemblies survived the drops without damage. It was found that while the LCD assemblies of the first embodiment survived the impact of this test also, the shock mounts 2 of the first embodiment did not remain in place after repeated testing. The second and third embodiments were designed to overcome this problem. Shock mounts 42a,b and 62a,b extend from one corner to another corner along respective edges 40-4,3 and 60-4,3. In another test, the portable computer containing the invention was compressed by having a user sit on chairs of various types while the computer was in the user's back pocket (a potential mishap likely to occur with pocket sized portable computers), thus applying stress to the computer housing. An inspection of the portable computer after the compression test revealed no damage to the LCD assembly. The LCD mounting structures, according to all above embodiments, are designed to absorb the shock associated with dropping or other day-to-day handling of a portable computer and thereby protects the LCD (glass and circuitry) from damage.

While particular embodiments of the present invention have been shown and described, it will be obvious to those skilled in the art that changes and modifications may be made without departing from this invention in its broader aspects. For example, although embodiments having two and four shock mounts are shown, another embodiment having a single shock mount extending around the perimeter of the LCD assembly could also be made. Therefore, the appended claims are to encompass within their scope all such changes and modifications as fall within the true spirit and scope of this invention.

What is claimed is:

1. A method of mounting a liquid crystal display (LCD) assembly having first and second opposing edges, said method comprising the steps of:

mounting first and second resilient shock mounts on an associated one of the opposing edges of the LCD assembly by positioning a slot in each shock mount over each said associated edge of the LCD assembly, each said slot having a pair of closed ends which secure said associated edge, thereby retaining said edges within said associated slots;

installing the LCD assembly and said mounted shock mounts into a housing;

placing a horizontal plate into said housing over the LCD assembly and said shock mounts, said horizontal plate covering said shock mounts; and joining together said horizontal plate with said housing with said shock mounts interposed between said housing and said horizontal plate to fixedly position the LCD assembly and shock mounts with respect to said housing, wherein the LCD assembly is suspended away from said horizontal plate and said housing.

2. The method of claim 1, wherein said shock mounts are compressed during said joining.

3. The method of claim 1, wherein said horizontal plate is joined to said housing by ultrasonic welding.

4. The method of claim 1, wherein said horizontal plate is joined to said housing by chemical bonding.

5. The method of claim 1, wherein said step of joining hermetically seals said housing and said horizontal plate.

6. The method of claim 1, further comprising the step of evacuating said housing prior to said step of joining.

7. The method according to claim 1 further comprising the step of applying a transparent film on a top glass plate of said LCD assembly prior to said step of mounting said plurality of resilient shock mounts.

8. The method according to claim 1, wherein said horizontal plate is joined to said housing with screws.

\* \* \* \* \*